(12) United States Patent
Gupta et al.

(10) Patent No.: US 11,932,390 B2
(45) Date of Patent: Mar. 19, 2024

(54) WING SHAPE CONTROL

(71) Applicant: Toyota Motor Engineering & Manufacturing North America, Inc., Plano, TX (US)

(72) Inventors: Rikin Gupta, Ann Arbor, MI (US); Shardul Singh Panwar, Ann Arbor, MI (US); Taewoo Nam, Ann Arbor, MI (US); Deborah Bumgardner, Garden City, MI (US); Yufei Zhu, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/721,793

(22) Filed: Apr. 15, 2022

(65) Prior Publication Data
US 2023/0331372 A1 Oct. 19, 2023

(51) Int. Cl.
*B64C 3/52* (2006.01)
(52) U.S. Cl.
CPC ..................... *B64C 3/52* (2013.01)
(58) Field of Classification Search
CPC .. B64C 3/52; B64C 3/546; B64C 9/32; B64C 9/323; B64C 9/326
See application file for complete search history.

(56) References Cited

U.S. PATENT DOCUMENTS

| | | | |
|---|---|---|---|
| 1,841,921 A | 1/1932 | Spiegel | |
| 2,565,990 A | 8/1951 | Richard | |
| 4,671,473 A | 6/1987 | Goodson | |
| 4,722,499 A | 2/1988 | Klug | |
| 5,072,894 A | 12/1991 | Cichy | |
| 5,114,104 A * | 5/1992 | Cincotta | B64C 3/48 244/99.8 |

(Continued)

FOREIGN PATENT DOCUMENTS

| | | |
|---|---|---|
| CN | 105946515 A | 9/2016 |
| EP | 0772544 B1 | 2/2005 |

(Continued)

OTHER PUBLICATIONS

Buckner, et al., "Roboticizing fabric by integrating functional fibers", Proceedings of the National Academy of Sciences (PNAS), vol. 117, No. 41, pp. 25360-25369, Oct. 13, 2020 (10 pages).

(Continued)

*Primary Examiner* — Richard G Davis
(74) *Attorney, Agent, or Firm* — Christopher G. Darrow; Darrow Mustafa PC

(57) ABSTRACT

An aircraft can include a wing. A morphing member can be operatively connected to the wing. The morphing member can include a base and a shape memory material member operatively connected to the base. The base can be made of a flexible material. When the shape memory material member is activated, a shape of the morphing member can change. As a result, one or more aerodynamic characteristics of the aircraft can be changed. In some arrangements, the flexible material can be a fabric, and the shape memory material member can be a shape memory alloy wire.

24 Claims, 12 Drawing Sheets

(56) References Cited

U.S. PATENT DOCUMENTS

| | | | |
|---|---|---|---|
| 5,529,458 A * | 6/1996 | Humpherson | B64C 3/141 |
| | | | 416/20 R |
| 5,686,003 A | 11/1997 | Ingram et al. | |
| 5,752,672 A * | 5/1998 | McKillip, Jr. | B64C 27/001 |
| | | | 244/99.8 |
| 6,345,790 B1 | 2/2002 | Brix | |
| 6,545,384 B1 * | 4/2003 | Pelrine | F02G 1/043 |
| | | | 977/788 |
| 6,578,798 B1 | 6/2003 | Dizarevic et al. | |
| 7,306,187 B2 | 12/2007 | Lavan | |
| 7,503,527 B1 | 3/2009 | Fairchild | |
| 7,744,038 B2 * | 6/2010 | Sankrithi | B64C 23/076 |
| | | | 244/199.4 |
| 7,878,459 B2 | 2/2011 | Mabe et al. | |
| 7,900,876 B2 | 3/2011 | Eberhardt | |
| 8,322,650 B2 | 12/2012 | Kelleher | |
| 8,439,313 B2 | 5/2013 | Rawdon et al. | |
| 8,534,611 B1 * | 9/2013 | Pitt | B64C 3/48 |
| | | | 244/214 |
| 8,757,555 B2 | 6/2014 | Werthmann et al. | |
| 8,882,049 B2 * | 11/2014 | Shams | B64C 23/04 |
| | | | 244/203 |
| 8,991,769 B2 * | 3/2015 | Gandhi | B64C 3/546 |
| | | | 244/129.1 |
| 9,555,895 B2 | 1/2017 | Vander Lind et al. | |
| 9,981,421 B2 | 5/2018 | Marcoe et al. | |
| 10,191,550 B1 | 1/2019 | Nussbaum et al. | |
| 10,336,412 B2 | 7/2019 | Morris | |
| 10,343,763 B2 | 7/2019 | Cross | |
| 10,625,847 B2 | 4/2020 | Dhandhania | |
| 10,773,487 B2 | 9/2020 | Frigerio et al. | |
| 10,933,974 B2 | 3/2021 | Tsuruta et al. | |
| 10,981,643 B2 | 4/2021 | Cross | |
| 11,254,412 B2 | 2/2022 | Dees et al. | |
| 11,279,469 B2 | 3/2022 | Petscher et al. | |
| 11,520,355 B2 | 12/2022 | Gupta et al. | |
| 2003/0150957 A1 | 8/2003 | Thomas | |
| 2005/0121945 A1 * | 6/2005 | Browne | B64C 3/48 |
| | | | 296/180.1 |
| 2006/0027703 A1 * | 2/2006 | Bussom | B64C 23/072 |
| | | | 244/17.13 |
| 2006/0049307 A1 | 3/2006 | Schweiger | |
| 2009/0175726 A1 * | 7/2009 | Rosati | F04D 29/368 |
| | | | 416/241 A |
| 2009/0283643 A1 | 11/2009 | Sar et al. | |
| 2010/0000991 A1 * | 1/2010 | Henry | B64C 3/56 |
| | | | 219/679 |
| 2010/0135806 A1 | 6/2010 | Benito | |
| 2011/0300358 A1 | 12/2011 | Blohowiak et al. | |
| 2012/0292155 A1 | 11/2012 | Gunter | |
| 2014/0331665 A1 * | 11/2014 | Shivashankara | F03G 7/065 |
| | | | 60/527 |
| 2015/0129715 A1 * | 5/2015 | Madsen | B64C 9/02 |
| | | | 244/99.8 |
| 2016/0176506 A1 | 6/2016 | Cross | |
| 2016/0345088 A1 | 11/2016 | Vilermo et al. | |
| 2018/0249772 A1 | 9/2018 | Koo et al. | |
| 2020/0164963 A1 | 5/2020 | da Silva et al. | |
| 2020/0172227 A1 * | 6/2020 | Way | B64C 3/56 |
| 2021/0155338 A1 * | 5/2021 | Vijgen | B64C 9/04 |
| 2022/0276661 A1 | 9/2022 | Gupta et al. | |
| 2022/0373095 A1 | 11/2022 | Panwar et al. | |

FOREIGN PATENT DOCUMENTS

| | | |
|---|---|---|
| EP | 1420094 B1 | 5/2005 |
| EP | 3206949 B1 | 8/2018 |
| JP | 2020103843 A | 7/2020 |
| WO | 2015150470 A1 | 10/2015 |
| WO | 2019186208 A1 | 10/2019 |

OTHER PUBLICATIONS

Buckner, et al., "Roboticizing fabric by integrating functional fibers", <http://movie-usa.glencoesoftware.com/video/10.1073/pnas.2006211117/video-4>.

U.S. Appl. No. 17/326,885, filed May 21, 2021.

Muller et al., "Design of Bio-Inspired Autonomous Airccraft for Bird Management", 16th Australian Aerospace Congress, Feb. 23-24, 2015 (8 pages).

Di Luca et al., "Bioinspired morphing wings for extended flight envelope and roll control of small drones", The Royal Society Publishing, 2016 (11 pages).

Bourdin et al., "Aircraft Control via Variable Cant-Angle Winglets", Journal of Aircraft, vol. 45, No. 2, Mar.-Apr. 2008, pp. 414-423 (10 pages).

Ameri et al., "Modelling the Dynamic Response of a Morphing Wing with Active Winglets", AIAA Atmospheric Flight Mechanics Conference and Exhibit, Aug. 20-23, 2007 (19 pages).

Gupta et al., U.S. Appl. No. 17/186,251, filed Feb. 26, 2021.

Gupta et al., U.S. Appl. No. 17/721,931, filed Apr. 15, 2022.

Panwar et al., U.S. Appl. No. 17/326,885, filed May 21, 2021.

Blain, "Refrigerants not required: Flexible metal cooling prototype demonstrates extreme efficiency", New Atlas, Mar. 13, 2019 <https://newatlas.com/shape-memory-alloy-nitinol-heating-cooling/58837/> (13 pages).

* cited by examiner

WING SHAPE CONTROL

FIELD

The subject matter described herein relates in general to aircraft and, more particularly, to the control of aircraft.

BACKGROUND

Aircraft can be exposed to highly variable environments. As a result, the aircraft may be subjected to changing aerodynamic requirements. Some aircraft have wings that can change shape and configuration to meet these changing requirements.

SUMMARY

In one respect, the present disclosure is directed to an aircraft. The aircraft can include a wing. The wing and a morphing member operatively connected to the wing. The morphing member can include a base and a shape memory material member operatively connected to the base. The base can be made of a flexible material. Thus, a shape of the morphing member can change when the shape memory material member is activated.

In another respect, the present disclosure is directed to a system. The system can include an aircraft. The aircraft can include a wing. The aircraft can include a morphing member. The morphing member can be operatively connected to the wing. The morphing member can include a base and a shape memory material member operatively connected to the base. The base can be made of a flexible material. The system can further include one or more processors operatively connected to selectively cause the shape memory material member of the morphing member to be activated and deactivated.

In still another respect, the present disclosure is directed to a method for morphing a wing of an aircraft. A morphing member can be operatively connected to the wing. The morphing member can include a base and a shape memory material member operatively connected to the base. The base can be made of a flexible material. The method can include detecting a wing morphing activation condition. The method can include, responsive to detecting the wing morphing activation condition, activating the shape memory material member to cause the morphing member to morph into an activated configuration.

DETAILED DESCRIPTION

Figure 1:
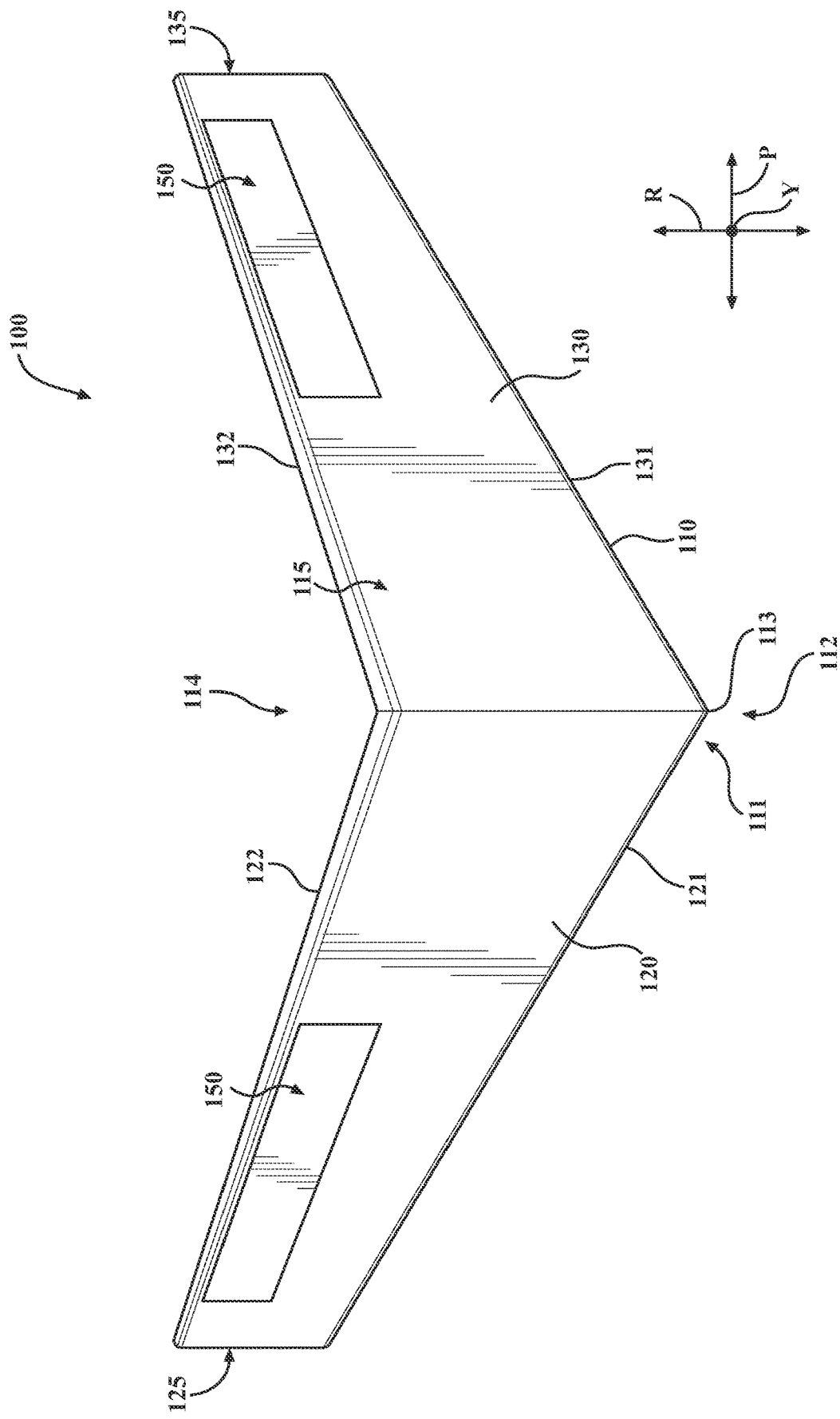
FIG. 1 is an example of an aircraft, showing an upper side of the aircraft.

Due to the dynamic environments in which aircraft operate, greater control authority over the aircraft can allow for enhanced control and improved operation of the aircraft. According to arrangements described herein, active control of the shape of a wing of an aircraft can be provided. An aircraft can include a morphing member operatively connected to the wing. The morphing member can include a base and a shape memory material member operatively connected to the base. The base can be made of a flexible material. When the shape memory material member is activated, a shape of the morphing member can change. As a result, one or more aerodynamic characteristics of the aircraft can be changed. Such arrangements can allow for greater control and stability of the aircraft.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an aircraft 100 is shown. The aircraft 100 can be any craft that is configured to fly or staying aloft in the air. In one or more arrangements, the aircraft 100 can be a kite. In one or more arrangements, the aircraft 100 can be a tailless aircraft. In one or more arrangements, the aircraft 100 can be a flying wing type aircraft.

Figure 4:
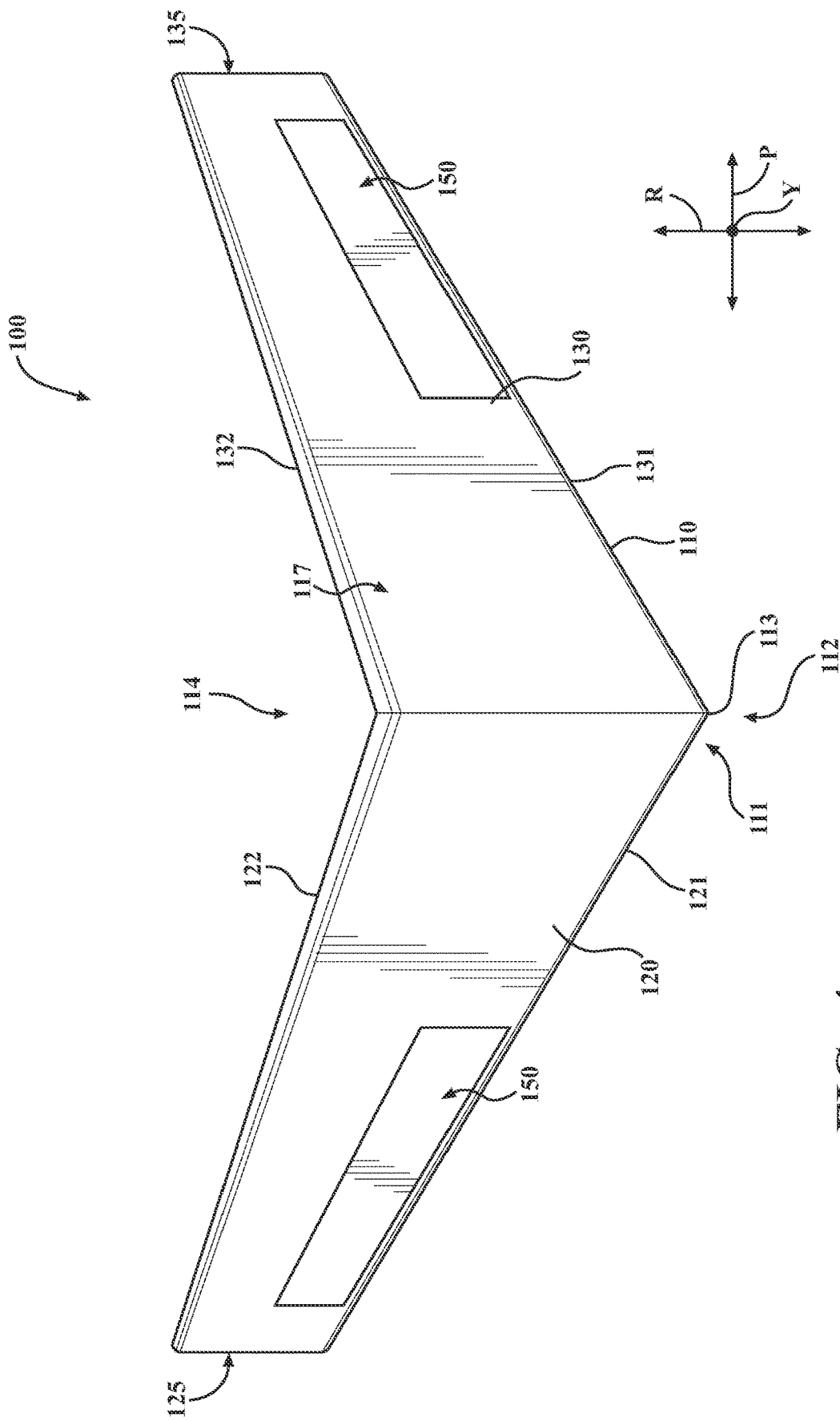
FIG. 4 is an example of an aircraft, showing a lower side of the aircraft.

The aircraft 100 can include a body 110. The body 110 can have any size, shape, and/or configuration. In the example shown, the body 110 can be generally V-shaped. The body 110 can be made of any suitable material, including, for example, fabric, metal, plastic, and/or wood. The aircraft 100 can have a front end 112 and a back end 114. The aircraft 100 can have an upper side 115 and a lower side 117 (FIG. 4). The terms "upper", "lower", "front", and "back" are used for convenience with respect to the relative position of the noted portion when the aircraft 100 is in its operational position.

The aircraft 100 can have a yaw axis Y, a pitch axis P, and a roll axis R. The yaw axis Y extends into and out of the page in FIG. 1. A nose 113 of the aircraft 100 can rotate right or left about the yaw axis Y. The pitch axis P extends in a left-right direction on the page in FIG. 1. The pitch axis P can generally extend transversely from wing to wing. The nose 113 of the aircraft 100 can rotate up and down about the pitch axis P. The roll axis R extends in a top-bottom direction on the page in FIG. 1. The roll axis R can generally extend from the front end 112 to the back end 114 of the aircraft 100. The aircraft 100 can rotate about the roll axis R. The aircraft 100 can rotate about one or more of these axes.

The body 110 can be at least partially hollow. Thus, the body 110 can have one or more inner chambers. The inner chamber. . . (s) can be substantially sealed to retain a fluid therein. The inner chamber(s) can be substantially fluid impermeable.

In one or more arrangements, the body 110 can be configured to be inflatable. Thus, the body 110 can include one or more ports or valves to allow air or other fluid to be delivered to and/or released from one or more inner chambers of the body 110. The inner chamber can be operatively connected to a fluid source. In some arrangements, the fluid source can be configured to maintain a constant fluid pressure in the inner chamber. In some implementations, the fluid source can include a pump. In some arrangements, the fluid source can include a gas canister capable of delivering a compressed gas.

The body 110 can include a first wing 120 and a second wing 130. The first wing 120 can extend substantially laterally from a central body region 111 to a first tip 125. The second wing 130 can extend substantially laterally from the central body region 111 to a second tip 135. While described herein as the first wing 120 and a second wing 130, it will be appreciated that the aircraft 100 can have or can be a single, continuous wing overall. In such case, the first wing 120 can be a first wing portion of a wing, and the second wing 130 can be a second wing portion of the same wing. In some arrangements, a substantial majority of the body 110 can be defined by the first wing 120 and the second wing 130, as in a flying wing type of aircraft. The first wing 120 can have a leading edge 121 and a trailing edge 122. The second wing 130 can have a leading edge 131 and a trailing edge 132.

The aircraft 100 can include a plurality of morphing members 150. Each morphing member 150 can include a base 152 and a shape memory material member 154. The base 152 can be made of any suitable material. For instance, in some arrangements, the base 152 can be made of a flexible, pliable, and/or compliant material. In one or more arrangements, the base 152 can be made of fabric, woven fabric, elastomer, plastic, shape-memory polymer (SMP), SMP composites, other pliable materials, or combinations thereof. In one or more arrangements, the base 152 can be made of a stitchable material, that is, a material that can be stitched and maintain integrity with stitches present in the material. In some arrangements, the base 152 can be made of one or more layers. In one or more arrangements, the base 152 can be made of a plurality of pieces of material. In one or more arrangements, the base 152 can be made of a single piece of material. The morphing members 150 can be relatively thin. In some arrangements, the morphing members 150 can be a sheet-like structure. The morphing members 150 can be made of a smart fabric.

The base 152 can have any suitable size, shape, and/or configuration. In one or more arrangements, the base 152 can be substantially rectangular in shape. However, in other arrangements, the base 152 can be substantially circular, substantially oval, substantially triangular, substantially polygonal, substantially trapezoidal, or other suitable shape.

The shape memory material member 154 can be operatively connected to the base 152. In some arrangements, a plurality of shape memory material members 154 can be operatively connected to the base 152. The shape memory material member 154 can be operatively connected to the base 152 in any suitable manner. For instance, in one or more arrangements, the shape memory material member 154 can be operatively connected to the base 152 by a plurality of stitches 155. The stitches 155 can affix the shape memory material member 154 to the base 152.

The stitches 155 can use one or more threads. Any suitable type of thread, now know or later developed, can be used. The threads can be blended, interwoven, and/or tightly wound. Further, the threads can be composed from a variety of materials, such as natural fibers, synthetic fibers, metals, shape memory material members, shape memory alloy, or other materials capable of being formed or woven into a thread, as well as combinations thereof. Thread can be stitched using any suitable type of stitch, now known or later developed.

In one or more arrangements, the shape memory material member 154 can be constrained on the base 152 in one or more areas. "Constrained on" includes being attached to the surface so as to keep the shape memory material member 154 substantially in contact with the base 152 when activated or deactivated. Thus, in the areas in which the shape memory material member 154 is constrained on the base 152, the shape memory material member 154 can be restricted from separating from and/or moving away from the base 152. As will be described in greater detail herein, such selective constraining can help to attain a desired morphed shape of the base 152. In some arrangements, the entire shape memory material member 154 can be constrained on the base 152.

In some arrangements, one or more portions of the shape memory material member 154 can be unconstrained. In such regions, the shape memory material members 154 are not stitched or operatively connected to the base 152. In the unconstrained region, the shape memory material member 154 can be exposed on the base 152 and/or generally allowed free movement relative to the base 152. In some instances, unconstrained regions can be provided in regions where a joint and/or a shape change is desired.

In some arrangements, the shape memory material member 154 can be at least partially embedded within the base 152. For instance, the shape memory material member 154 can be woven into the base 152. The shape memory material member 154 can be located on one or both sides of the base 152. In some arrangements, the shape memory material member 154 can extend between two bases 152. In such case, the shape memory material member 154 can be operatively connected to one or both of the bases 152. The two bases can be operatively connected to each other in any suitable manner. In such arrangements, the shape memory material member 154 is not substantially exposed on the exterior of the morphing member 150.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material member(s) 154 can be shape memory material wires. As an example, the shape memory material member(s) 154 can be shape memory alloy wire(s). Thus, when an activation input (i.e., heat) is provided to the shape memory alloy wire(s), the wire(s) can contract. The shape memory alloy wire(s) can be heated in any suitable manner, now known or later developed. For instance, the shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 90 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The wire(s) can be configured to provide an initial moment of from about 300 to about 600 N mm, or greater than about 500 N mm, where the unit of newton millimeter (N mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material member(s) 154 to go from a non-activated configuration to an activated configuration in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXI-NOL, which is available from Dynaolloy, Inc., Irvine, California. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connected with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material member(s) 154 are described, in one implementation, as being wire(s), it will be understood that the shape memory material member(s) 154 are not limited to being wire(s). Indeed, it is envisioned that suitable shape memory materials may be employed in a variety of other forms, such as strips, small sheets or slabs, cellular and lattice structures, helical or tubular springs, braided cables, tubes, or combinations thereof. In some arrangements, the shape memory material member(s) 154 may include an insulating coating.

Figure 12A:
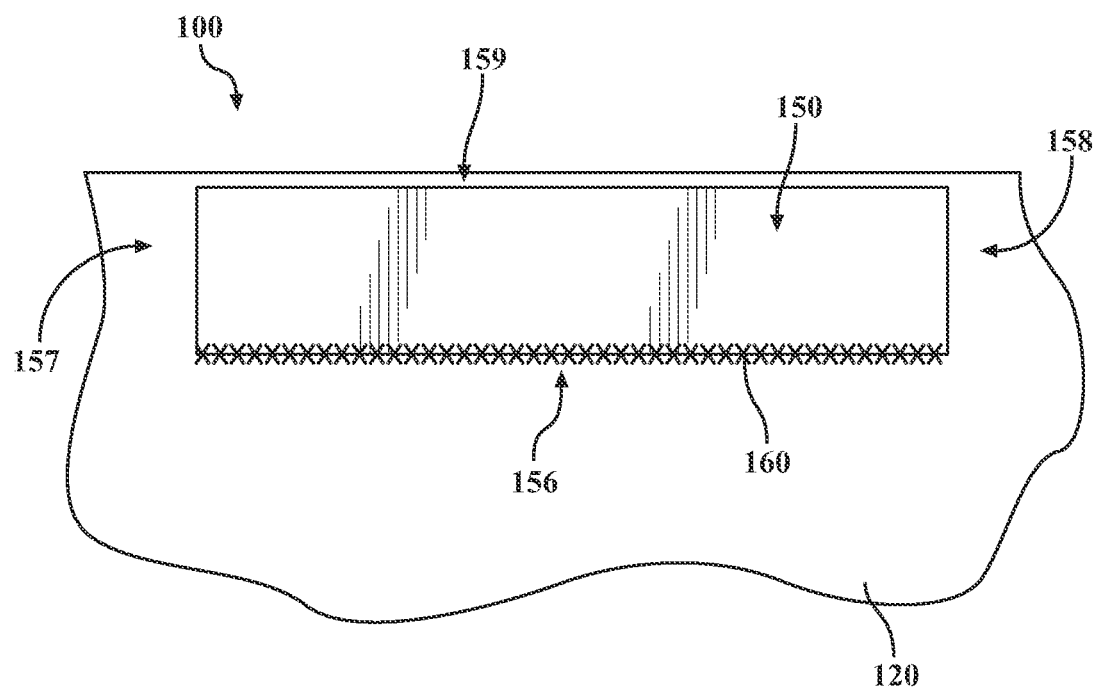
FIG. 12A shows an example of the morphing member operatively connected to a respective one of the wings of the aircraft on only one side of the morphing member.
Figure 12B:
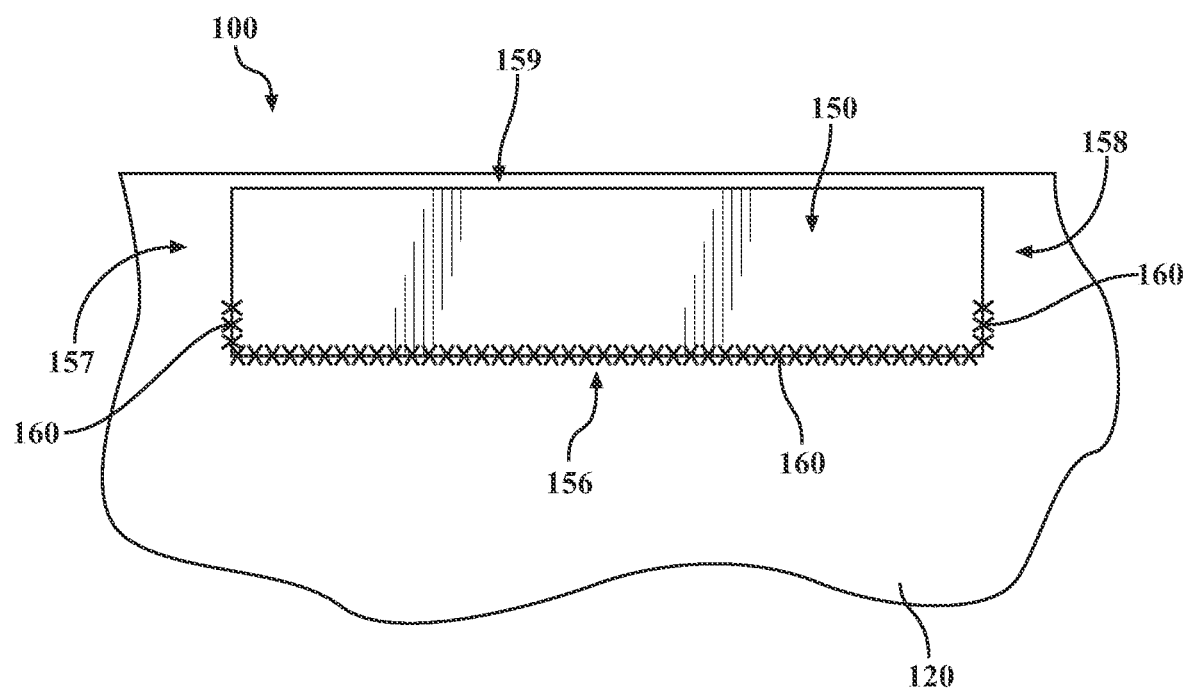
FIG. 12B shows an example of the morphing member operatively connected to a respective one of the wings of the aircraft, fully on one side and partially of two adjoining sides of the morphing member.

Each of the morphing members 150 can be operatively connected to the first wing 120 or to the second wing 130. The morphing members 150 can be operatively connected to the respective wing 120, 130 in any suitable manner. For instance, in one or more arrangements, the morphing members 150 can be operatively connected to the respective wing 120, 130 by a plurality of stitches 160 (FIGS. 12A-12B). The stitches 160 can affix the morphing members 150 to the respective wing 120, 130. Alternatively or additionally to the stitches 160, the morphing members 150 can be operatively connected to the respective wing 120, 130 by one or more fasteners, one or more adhesives, one or more forms of mechanical engagement, or any combination thereof. Due to the manner in which the morphing member 150 is operatively connected to the respective wing 120, 130, it will be appreciated that the morphing member 150 can be like a loose fabric panel on the wing. As such, the morphing member 150 can passively change shape under the influence of forces acting upon the aircraft 100.

Various example of the morphing member 150 operatively connected to a respective one of the wings is shown in FIGS. 12A-12B. In some arrangements, the morphing member 150 can be operatively connected to a respective one of the wings 120, 130 on only one side or on only one perimeter portion thereof. An example of such an arrangement is shown in FIG. 12A. In this example, the morphing member 150 can be substantially rectangular in shape. Only one of the sides 156 can be operatively connected to the first wing 120, such as by stitches 160. The other three sides 157, 158, 159 can be unattached to the first wing 120. Thus, the morphing member 150 can be like a loose piece of material on the first wing 120. While FIG. 12A shows the morphing member 150 operatively connected to the first wing 120, it will be understood that this description applies equally to the operative connection between the morphing member 150 and the second wing 130.

In some arrangements, the morphing member 150 can be operatively connected to a respective one of the wings 120, 130 on more than one side or more than one perimeter portion thereof. An example of such an arrangement is shown in FIG. 12B. In this example, the morphing member 150 can be substantially rectangular in shape. One side 156 of the morphing member 150 can be operatively connected to the first wing 120, and a portion of the two sides 157, 158 of the morphing member 150 that adjoin the first side 156 can be operatively connected to the first wing 120. The portions of the sides 157, 158 that are operatively connected to the first wing 120 can be those portions nearest the first side 156. The side 159 can be unattached to the first wing 120. In such arrangements, the morphing member 150 can be like a loose piece of material on the first wing 120. While FIG. 12B shows the morphing member 150 operatively connected to the first wing 120, it will be understood that this description applies equally to the operative connection between the morphing member 150 and the second wing 130.

The morphing members 150 can be operatively connected to the aircraft 100 in any suitable location. For instance, the morphing members 150 can be connected on the upper side 115 and/or the lower side 117 of the aircraft 100.

FIG. 1 shows an example in which the morphing members 150 are operatively connected to the upper side 115 of the aircraft 100. The morphing members 150 can be located in an outboard region of the aircraft 100. For instance, the morphing members 150 can be located proximate the trailing edge 119 of the aircraft 100. In some respects, the morphing members 150 can be considered to be surrogates for ailerons of the aircraft 100. In some arrangements, the morphing members 150 can be slightly spaced from the trailing edge 119. In other arrangements, a portion of the morphing members 150 can be located at the trailing edge 119. In some arrangements, the morphing members 150 can extend substantially parallel to the trailing edge 119. It should be noted that a free end or a free perimeter portion of the morphing members 150 can be located proximate the trailing edge 119. The morphing member 150 can be substantially parallel to the trailing edge 119.

The morphing members 150 can be elongated substantially in the direction of the wing 120, 130. The morphing members 150 can span any suitable length of the respective wing 120, 130. In some arrangements, the morphing members 150 can space about 70 percent, about 60 percent, about 50%, about 40%, about 30%, about 20%, or about 10% of the length of the respective wing 120, 130 or less. The morphing members 150 can be located anywhere along the length of the wing 120, 130. In some arrangements, the morphing members 150 can be located closer to a center line of the aircraft 100 or to the central body region 111. In other arrangements, the morphing members 150 can be located closer to the tip 125, 135 of the wings 120, 130. In some arrangements, the morphing members 150 can be elongated substantially in the front to back direction of the respective wing 120, 130.

In some arrangements, the morphing member 150 can be located on the respective wing 120, 130 so that, when in a non-activated condition, the morphing member 150 forms a raised area on the wing 120, 130. In other arrangements, the wings 120, 130 can be configured to provide a recessed area in which the morphing member 150 can reside. In such case, when in a non-activated condition, the morphing member 150 can be substantially flush with the respective wing 120, 130.

FIG. 4 shows an example in which the morphing members 150 are operatively connected to the lower side 117 of the aircraft 100. The morphing members 150 can be located proximate the leading edge 121 of the first wing 120 and/or the leading edge 131 of the second wing 130. In some respects, the morphing members 150 in such location can be considered to be surrogates for coverts of the aircraft 100. In some arrangements, the morphing members 150 can be slightly spaced from the leading edge(s) 121, 131. In other arrangements, a portion of the morphing members 150 can be located at the leading edge(s) 121, 131. In some arrangements, the morphing members 150 can extend substantially parallel to the leading edge(s) 121, 131. It should be noted that an operatively connected side or an operatively connected perimeter portion of the morphing members 150 can be located proximate the leading edge(s) 121, 131.

FIG. 1 shows a plurality of the morphing members 150 attached to the upper side 115 of the aircraft 100, and FIG. 4 shows a plurality of the morphing members 150 attached to the lower side 117 of the aircraft 100. In some arrangements, the morphing members 150 can be operatively connected to the upper side 115 only. In some arrangements, the morphing members 150 can be operatively connected to the lower side 117 only. In still other arrangements, the morphing members 150 can be operatively connected to both the upper side 115 and the lower side 117 of the aircraft 100.

In the example shown in FIG. 1, the morphing member 150 operatively connected to the first wing 120 and the morphing member 150 operatively connected to the second wing 130 can be substantially identical to each other. However, it will be appreciated that, in some arrangements, the morphing member 150 operatively connected to the first wing 120 and the morphing member 150 operatively connected to the second wing 130 can be different from each other in one or more respects, including, for example, size, shape, configuration, areas of attachment, location, orientation, quantity, material, and activated configuration, just to name a few possibilities.

The morphing members 150 on the upper side 115 of the aircraft 100 can be substantially identical to the morphing members 150 on the lower side 117 of the aircraft 100. Alternatively, the morphing members 150 on the upper side 115 of the aircraft 100 can be different from the morphing members 150 on the lower side 117 of the aircraft 100 in one or more respects, including any of those described above.

FIG. 1 shows one morphing member operatively connected to the first wing 120, and one morphing member 150 operatively connected to the second wing 130. However, it will be appreciated that there can be any suitable quantity of the morphing members 150 provided on the first wing 120 and the second wing 130. As an example, referring to FIG. 5, there can be a plurality of morphing members 150 operatively connected to the first wing 120 and a plurality of morphing members 150 operatively connected to the second wing 130. The plurality of morphing members 150 can be distributed in any suitable manner. In the example shown, the plurality of morphing members 150 can be arranged along the length of the respective wing 120, 130. However, in some arrangements, the plurality of morphing members 150 can, alternatively or additionally, be arranged in the front to back direction of the aircraft 100. The plurality of morphing members 150 can be substantially adjacent to each other, or the plurality of the morphing members 150 can be spaced from each other. The plurality of morphing members 150 can be substantially aligned with each other in one or more directions. Alternatively, the plurality of morphing members 150 can be offset from each other in one or more directions.

Figure 11A:
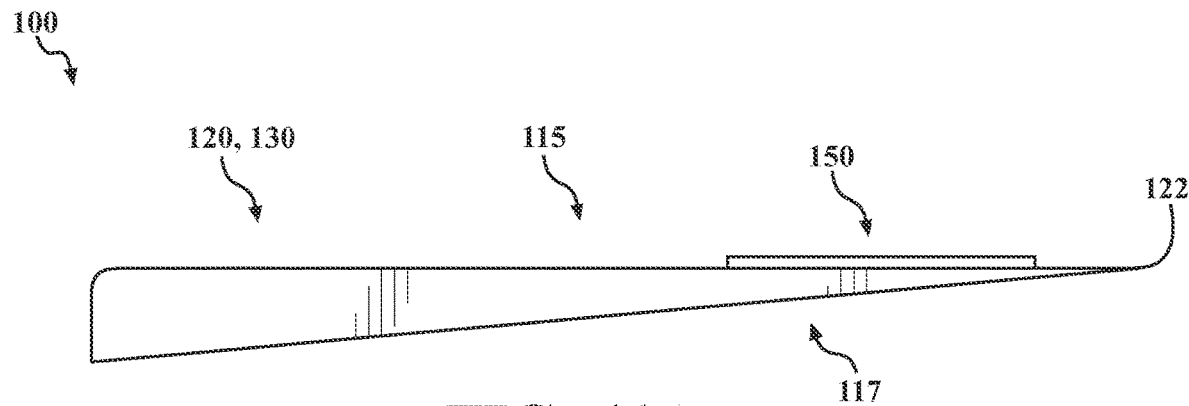
FIG. 11A is a side view of a portion of an aircraft, showing a morphing member in a non-activated condition.

The morphing members 150 can have a non-activated condition and an activated condition. When in a non-activated condition, the morphing members 150 can be substantially flat. The morphing members 150 can lay substantially flat against an exterior surface of a respective wing 120, 130. An example of such a non-activated condition is shown in FIG. 11A. However, in some arrangements, the morphing members 150 can have other, non-flat configurations in the non-activated condition.

Figure 11B:
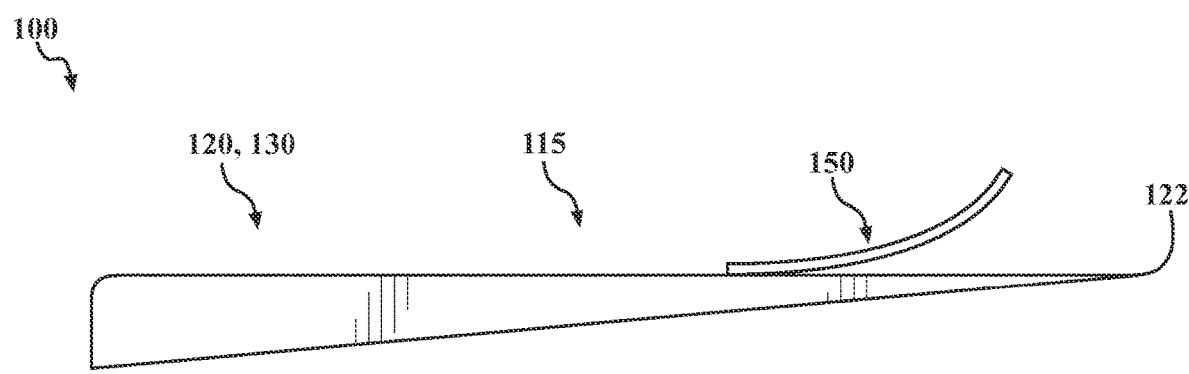
FIG. 11B is a side view of a portion of an aircraft, showing a morphing member in an activated condition in which the morphing member curls in one direction.
Figure 11C:
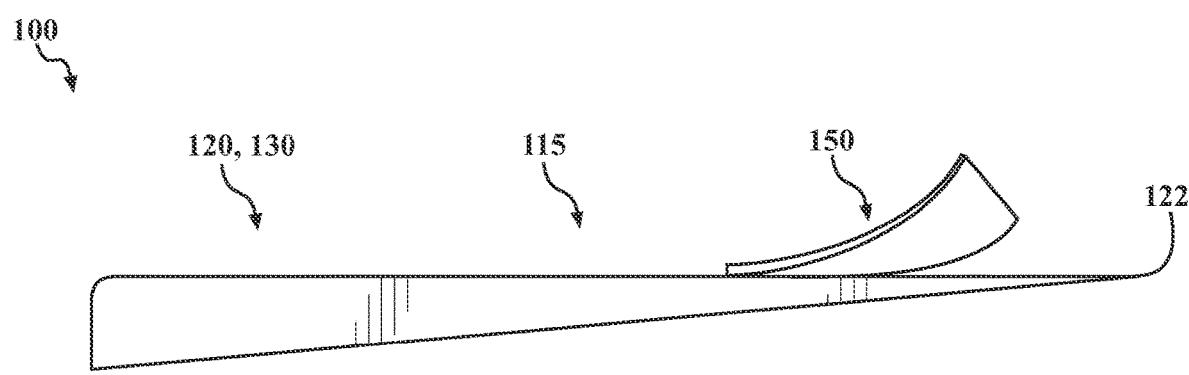
FIG. 11C is a side view of a portion of an aircraft, showing a morphing member in an activated condition in which the morphing member curls in a plurality of different directions.

When activated, the morphing members 150 can have various configurations. In one or more arrangements, the morphing members 150 can be configured to bend, curl, or curve in the activated condition. One example of such an activated condition is shown in FIG. 11B. In this example, the free side of the morphing member 150 can curl upward away from the respective wing 120, 130. In one or more arrangements, the morphing members 150 can be configured to curl in a plurality of directions when in the activated condition. One example of such an activated condition is shown in FIG. 11C. In this example, the free side of the morphing member 150 can curl upward away from the respective wing 120, 130. In the orientation shown in FIGS. 11C, the morphing member 150 can curl counterclockwise. In addition, the morphing member 150 can curl along at least a portion of its length. The curling can be in a different direction than the other direction of curling, as is shown in FIG. 11C. Here, the additional curling can occur into the page on FIG. 11. This second mode of curling can create a twisting type of movement of the morphing member 150.

The various configurations of the activated condition of can be achieved in various ways. For instance, the shape memory material member 154 can be arranged in a pattern on the base 152. The pattern can be designed such that, when the shape memory material member 154 is activated (e.g., by supplying electrical energy to it), the shape memory material member 154 can contract and cause the morphing member 150 to deform in a desired motion. Various non-limiting examples of patterns in which the morphing member 150 can be arranged are shown in FIGS. 2A-2D.

Figure 2A:
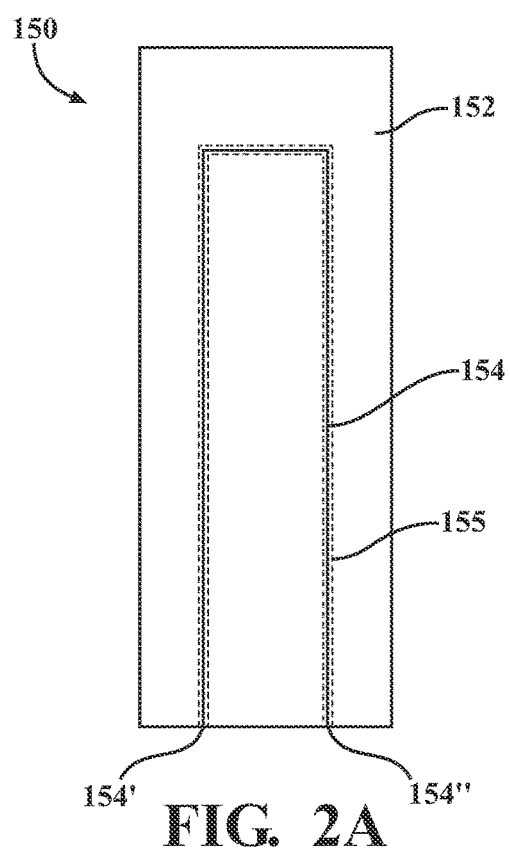
FIG. 2A shows an example of a morphing member with a shape memory material member arranged in a first pattern.

In some arrangements, the morphing member 150 can be configured to bend, curl, or curve when the morphing member 150 is activated. FIG. 2A shows one example of the morphing member 150 being configured for such morphing movement when activated. As can be seen, the shape memory material member 154 can be arranged in a substantially U-shaped pattern on the base 152. In this arrangement, a first end 154' and a second end 154" of the shape memory material member 154 can be located on the same side of the morphing member 150.

Figure 2B:
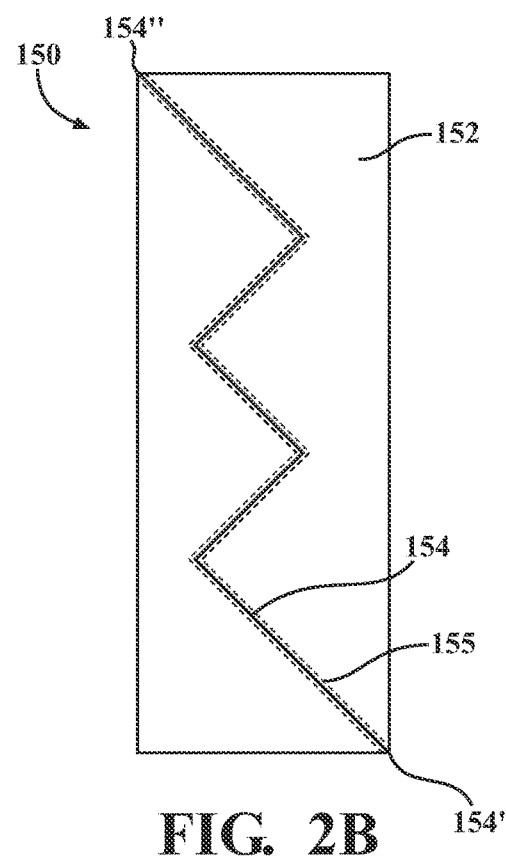
FIG. 2B shows an example of a morphing member with a shape memory material member arranged in a second pattern.
Figure 2C:
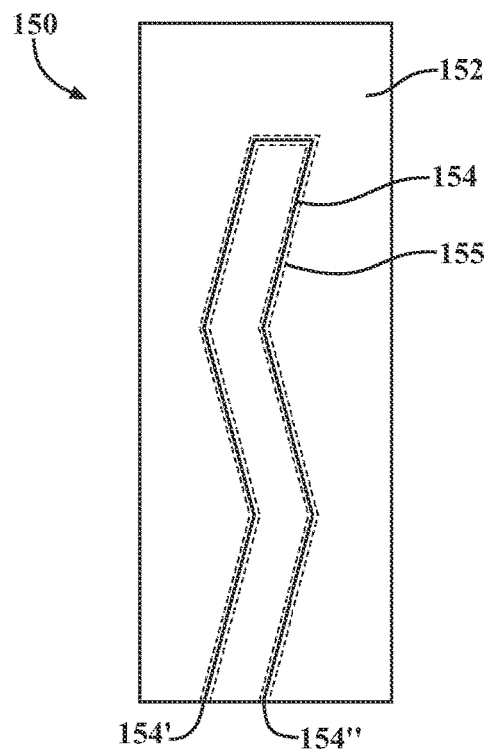
FIG. 2C shows an example of a morphing member with a shape memory material member arranged in a third pattern.
Figure 2D:
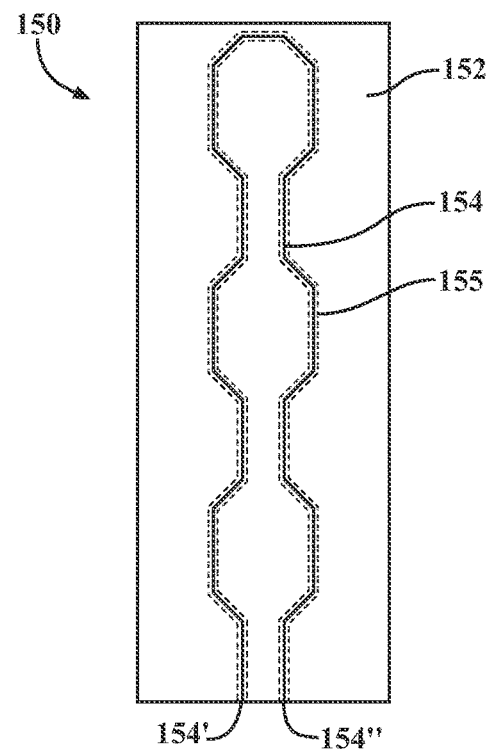
FIG. 2D shows an example of a morphing member with a shape memory material member arranged in a fourth pattern.

In other arrangements, the morphing member 150 can be configured to bend, curl, or curl in a plurality of directions when the morphing member 150 is activated. As an example, one direction of curling can be similar to the direction shown in FIG. 2A, and another direction of curling can be generally in a direction that is transverse to the direction of curling in FIG. 2A. FIGS. 2B-2D show examples of the morphing member 150 being configured for such morphing movement when activated. Referring to FIG. 2B, the shape memory material member 154 can be arranged in a single zig-zag pattern. In this arrangement, the first end 154' and the second end 154" of the shape memory material member 154 can be located on opposite sides of the morphing member 150. Referring to FIG. 2C, the shape memory material member 154 can double back so as to form a double zig-zag pattern. In this arrangement, the first end 154' and the second end 154" of the shape memory material member 154 can be located on the same side of the morphing member 150. FIG. 2D shows the shape memory material member 154 arranged to double back in an undulating pattern. Here, the first end 154' and the second end 154" of the shape memory material member 154 can be located on the same side of the morphing member 150.

FIGS. 2A-2D are merely a few examples of different arrangements of the shape memory material member 154. It will be appreciated that these arrangements are merely examples and are not intended to be limiting. Of course, the shape memory material member 154 can be arranged in any suitable manner to provide a desired activated configuration of the morphing member 150. It should be noted that the morphing members 150 shown in FIGS. 2A-2D are elongated in a different direction than the morphing members 150 shown in FIGS. 1 and 4. However, it will be appreciated that the morphing members 150 can be configured or arranged in any suitable manner. It will also be appreciated that the patterns of the shape memory material members 154 shown in FIGS. 2A-2D can be implemented in connection with differently oriented morphing members, such as those shown in FIGS. 1 and 4.

Figure 3:
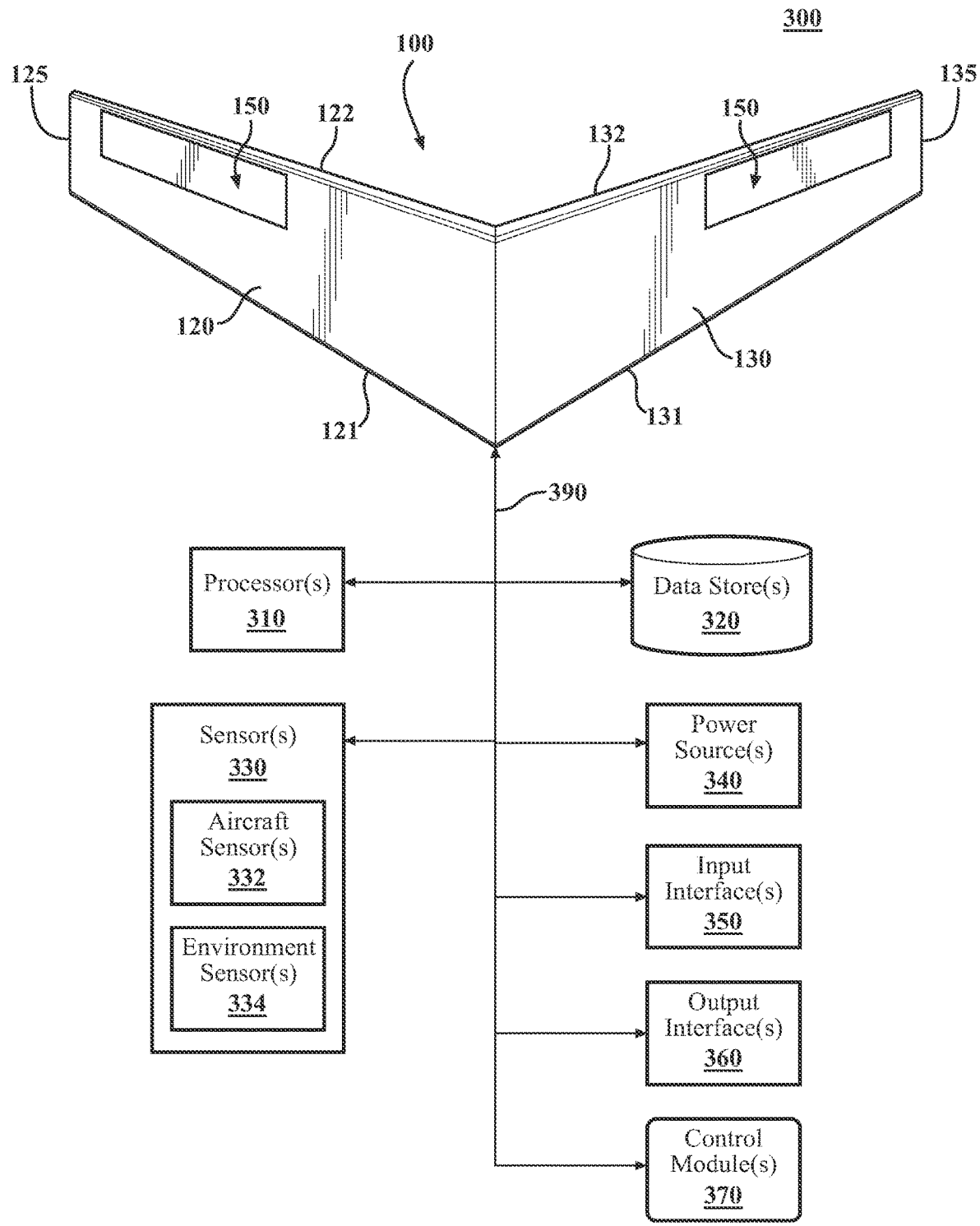
FIG. 3 is an example of an aircraft system.

Referring to FIG. 3, an example of a system 300. The system 300 can include various elements. Some of the possible elements of the system 300 are shown in FIG. 3 and will now be described. It will be understood that it is not necessary for the system 300 to have all of the elements shown in FIG. 3 or described herein. The system 300 can have any combination of the various elements shown in FIG. 3. Further, the system 300 can have additional elements to those shown in FIG. 3. In some arrangements, the system 300 may not include one or more of the elements shown in FIG. 3. Further, various elements may be located on or within the aircraft 100, but it will be understood that one or more of these elements can be located external to the aircraft 100. Thus, such elements are not located on, within, or otherwise carried by the aircraft 100. Further, the elements shown may be physically separated by large distances. Indeed, one or more of the elements can be located remote from the other elements of the system 300.

The system 300 can include the aircraft 100, one or more processors 310, one or more data stores 320, one or more sensors 330, one or more power sources 340, one or more input interfaces 350, one or more output interfaces 360, and/or one or more control modules 370. Each of these elements will be described in turn below.

As noted above, the system 300 can include one or more processors 310. "Processor" means any component or group of components that are configured to execute any of the processes described herein or any form of instructions to carry out such processes or cause such processes to be performed. The processor(s) 310 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 310 can include at least one hardware circuit (e.g., an integrated circuit) configured to carry out instructions contained in program code. In arrangements in which there is a plurality of processors 310, such processors can work independently from each other, or one or more processors can work in combination with each other.

The system 300 can include one or more data stores 320 for storing one or more types of data. The data store(s) 320 can include volatile and/or non-volatile memory. Examples of suitable data stores 320 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 320 can be a component of the processor(s) 310, or the data store(s) 320 can be operatively connected to the processor(s) 310 for use thereby. The term "operatively connected," as used throughout this description, can include direct or indirect connections, including connections without direct physical contact.

In some arrangements, the data store(s) 320 can store shape memory material data about the shape memory material members 154 of the morphing members 150. As an example, the shape memory material data can include material properties and characteristics of the shape memory material members 154. In some instances, the shape memory material data can include stress-strain curves for the more shape memory material members 154, including at different temperatures.

The system 300 can include one or more sensors 330. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process. The sensor(s) 330 can be operatively connected to the processor(s) 310, the data store(s) 320, and/or other elements of the system 300 (including any of the elements shown in FIG. 3).

The sensor(s) 330 can include any suitable type of sensor. The sensor(s) 330 can be configured to acquire sensor data about the aircraft and/or about an external environment of the aircraft. Various examples of sensors will be described herein. However, it will be understood that the embodiments are not limited to the particular sensors described. One or more of the sensors(s) 330 can be located onboard the aircraft 100.

The sensor(s) 330 can include one or more aircraft sensors 332. The aircraft sensor(s) 332 can be configured to acquire, detect, determine, assess, monitor, measure, quantify and/or sense aircraft data. "Aircraft data" includes and data or information about the aircraft 100 itself or any system, device, component or portion thereof. Aircraft data or information can include, for example, roll, yaw, pitch, position, orientation, speed, weight, temperature, pressure, stress, and/or strain, just to name a few possibilities. In one or more arrangements, the aircraft sensor(s) 332 can include an inertial measurement unit (IMU). Additional examples of the aircraft sensor(s) 332 can include one or more speedometers, weight sensors, pressure sensors, position and/or displacement sensors, level sensors, force sensors, torque sensors, gyroscopes, accelerometers, a dead-reckoning system, a global navigation satellite system (GNSS), a global positioning system (GPS), radio compass (NDB), altitude sensors, attitude sensors, Angle-of-Attack (AoA) sensors, altimeters, and/or other suitable sensors. The aircraft sensor(s) 332 can be any type of sensor, now known or later developed.

The sensor(s) 330 can include one or more environment sensors 334. The environment sensor(s) 334 can be configured to acquire, detect, determine, assess, monitor, measure, quantify, acquire, and/or sense environment data. "Environment data" includes and data or information about the external environment in which the aircraft 100 is located. For instance, the environment sensor(s) 334 can include one or more wind speed sensors and/or one or more wind angle sensors. In one or more arrangements, the environment sensor(s) 334 can include one or more cameras, one or more radar sensors, one or more lidar sensors, one or more sonar sensors, and/or one or more ranging sensors. In one or more arrangements, the environment sensor(s) 334 can include one or more temperature sensors, pressure sensors, proximity sensors, flow sensors, and/or others. In one or more arrangements, the environment sensor(s) 334 can be configured to detect atmospheric phenomena that may affect the stability of the aircraft 100, such as turbulence, changes in barometric pressure, wind gusts, just to name a few possibilities. In one or more arrangements, the environment sensor(s) 334 can be configured to detect objects in the external environment. In one or more arrangements, the environment sensor(s) 334 can include one or more pitot tubes. The environment sensor(s) 334 can include any type of sensor, now known or later developed.

As noted above, the system 300 can include one or more power sources 340. The power source(s) 340 can be any power source capable of and/or configured to energize the shape memory material member(s) 154. For example, the power source(s) 340 can include one or more batteries, one or more fuel cells, one or more generators, one or more alternators, one or more solar cells, and combinations thereof. The power source(s) 340 can be any power source capable of and/or configured to supply energy to the shape memory material member(s) 154. The power source(s) 340 can be a source of electrical energy.

The system 300 can include one or more input interfaces 350. An "input interface" includes any device, component, system, element or arrangement or groups thereof that enable information/data to be entered into a machine. The input interface(s) 350 can receive an input from any source, such as a remote operator of the aircraft 100. Any suitable input interface 350 can be used, including, for example, a keypad, display, touch screen, multi-touch screen, button, joystick, mouse, trackball, microphone, gesture recognition (radar, lidar, camera, or ultrasound-based), and/or combinations thereof.

The system 300 can include one or more output interfaces 360. An "output interface" includes any device, component, system, element or arrangement or groups thereof that enable information/data to be presented to a user (e.g., a person) or other entity. The output interface(s) 360 can present information/data to a user or other entity. The output interface(s) 360 can include a display, an earphone, haptic device, and/or speaker. Some components of the system 300 may serve as both a component of the input interface(s) 350 and a component of the output interface(s) 360. In one or more arrangements, the input interface(s) 350 and/or the output interface(s) 360 can be provided remote from the aircraft 100, such as on a remote-control device, unit, or system, which can be operated by a remote human operator.

The system 300 can include one or more modules. The modules can be implemented as computer readable program code that, when executed by a processor, implement one or more of the various processes described herein. One or more of the modules can be a component of the processor(s) 310, or one or more of the modules can be executed on and/or distributed among other processing systems to which the processor(s) 310 is operatively connected. The modules can include instructions (e.g., program logic) executable by one or more processor(s) 310. Alternatively or in addition, one or more data stores 320 may contain such instructions.

The system 300 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 300 can include one or more control modules 370. The control module(s) 370 can include profiles and logic for actively controlling the aircraft 100 and/or controlling the morphing members 150 according to arrangements herein. The control module(s) 370 can be configured to, autonomously or in response to a remote command, cause one or more of the morphing members 150 to be activated or deactivated based on real-time operational conditions of the aircraft 100. The control module(s) 370 can help to ensure that the aircraft 100 remains airborne, stable, stays at or moves to a desired altitude, moves in a desired manner, and/or otherwise manages operational forces and conditions.

The control module(s) 370 can be configured to determine when the morphing members 150 should be activated or deactivated. The control module(s) 370 can be configured to do so in any suitable manner. For instance, the control module(s) 370 can be configured to analyze data or information acquired by the sensor(s) 330 (e.g., the aircraft sensors 332 and/or the environment sensors 334). Alternatively or additionally, the control module(s) 370 can be configured to detect user inputs (e.g., commands) provided on the input interface(s) 350. The control module(s) 370 can retrieve raw data from the sensor(s) 330 and/or from the data store(s) 320. The control module(s) 370 can use profiles, parameters, or setting loaded into the control module(s) 370 and/or stored in the data store(s) 320. The control module(s) 370 can be configured to control the morphing members 150 based on the sensor data. The control module(s) 370 can be configured to control movement of the morphing members 150.

The control module(s) 370 can analyze the sensor data to determine an appropriate action for the morphing members 150. For instance, the control module(s) 370 can detect forces (e.g., aerodynamic forces) affecting the aircraft 100. The control module(s) 370 can detect wind speeds and wind angles. The control module(s) 270 can detect roll, yaw, and/or pitch moments acting upon the aircraft 100. The control module(s) 370 can be configured to determine appropriate changes to the morphing members 150 to mitigate detected changes or conditions affecting the aircraft 100 and/or to stabilize the aircraft 100. As a further example, the control module(s) 370 can detect an altitude of the aircraft 100. The control module(s) 370 can be configured to determine which morphing members 150 to active or deactivate to keep the aircraft 100 at a current altitude or to cause the aircraft 100 to move to a different altitude. Various examples of such changes or configurations will be described herein.

The control module(s) 370 can be configured to cause the morphing members 150 to be activated or deactivated, individually or collectively or in any subset. As used herein, "cause" or "causing" means to make, force, compel, direct, command, instruct, and/or enable an event or action to occur or at least be in a state where such event or action may occur, either in a direct or indirect manner. For instance, the control module(s) 370 can selectively permit or prevent the flow of electrical energy from the power source(s) 340 to the shape memory material members 154 of the morphing members 150. For instance, the shape memory material members 154 can be activated by passing electrical current from the power source(s) 340 through the shape memory material members 154. The control module(s) 370 can be configured to selectively permit, restrict, adjust, alter, and/or prevent the flow of electrical energy from the power source(s) 340 to one or more of the shape memory material members 154. The control module(s) 370 can be configured send control signals or commands over a communication network 390 to the power source(s) 340, the morphing members 150, or other element of the system 200.

The control module(s) 370 can be configured to cause the morphing members 150 to be selectively activated or deactivated based on aircraft data and/or environment data. In some instances, the control module(s) 370 can be configured to cause the morphing members 150 to be selectively activated or deactivated based on user inputs (e.g., commands or other inputs indicative of activating or deactivating the morphing members 150). For instance, a user can provide an input on the input interface(s) 350. The input can be to activate or deactivate the morphing members 150. The control module(s) 370 can be configured to cause the morphing members 150 to be deactivated or activated in accordance with the user input.

In some instances, the control module(s) 370 can be configured to cause the morphing members 150 to be selectively activated or deactivated based on a current operational state of the aircraft 100. For instance, when the aircraft is in the process of landing, taking off, or hovering. The operational state of the aircraft 100 may be determined based on sensor data and/or user inputs.

In some arrangements, the control module(s) 370 can be configured to autonomously control the morphing members 150. Alternatively or additionally, the control module(s) 270 can be configured to control the morphing members 150 in response to remote control inputs.

The various elements of the system 300 can be communicatively linked to one another or one or more other elements through one or more communication networks 390. As used herein, the term "communicatively linked" can include direct or indirect connections through a communication channel, bus, pathway or another component or system. A "communication network" means one or more components designed to transmit and/or receive information from one source to another. The data store(s) 320 and/or one or more other elements of the system 300 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

It will be appreciated that the activation of the morphing member(s) 150 can be used as a control device for the aircraft 100. The activation of the morphing member(s) 150 can disrupt air flow about the aircraft 100. The disruption in the air flow will depend upon the amount of electrical energy applied to the morphing member(s) 150 as well as the manner in which the morphing member(s) 150 deform when activated. This disruption in the air flow can cause loss of lift on the corresponding side of the aircraft 100, thus causing a rolling moment. Through this principle, the morphing member(s) 150 can be used as a control device for the aircraft 100 and fabric based inflatable structures. FIG. 6-9 show various examples of active management of the morphing member(s) 150. It will be understood that the examples are not intended to be limiting.

Figure 6:
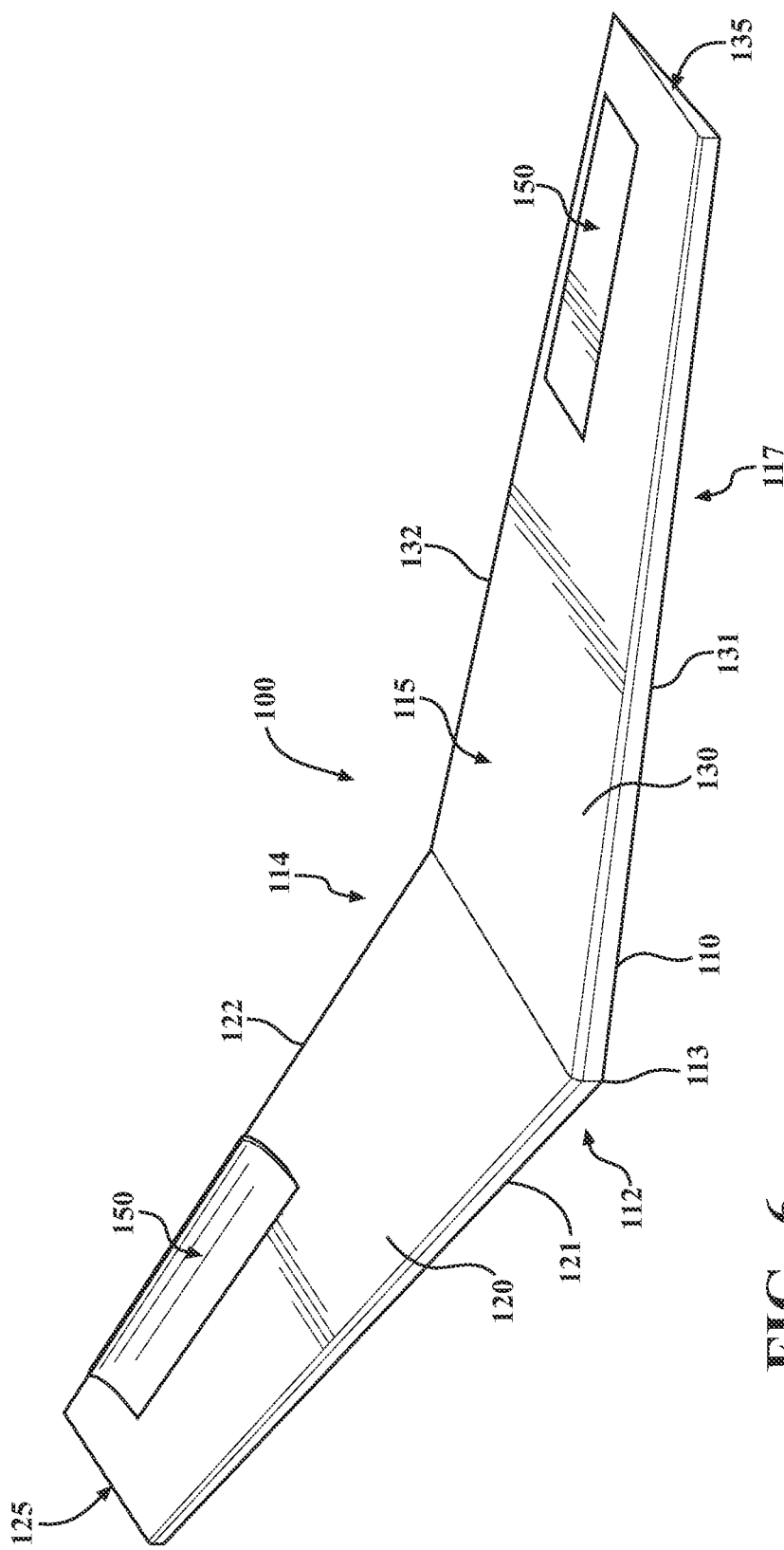
FIG. 6 shows an example of active management of the morphing members on the upper side of the aircraft, showing the morphing member on a first wing in an activated condition and the morphing member on a second wing in a non-activated condition.
Figure 7:
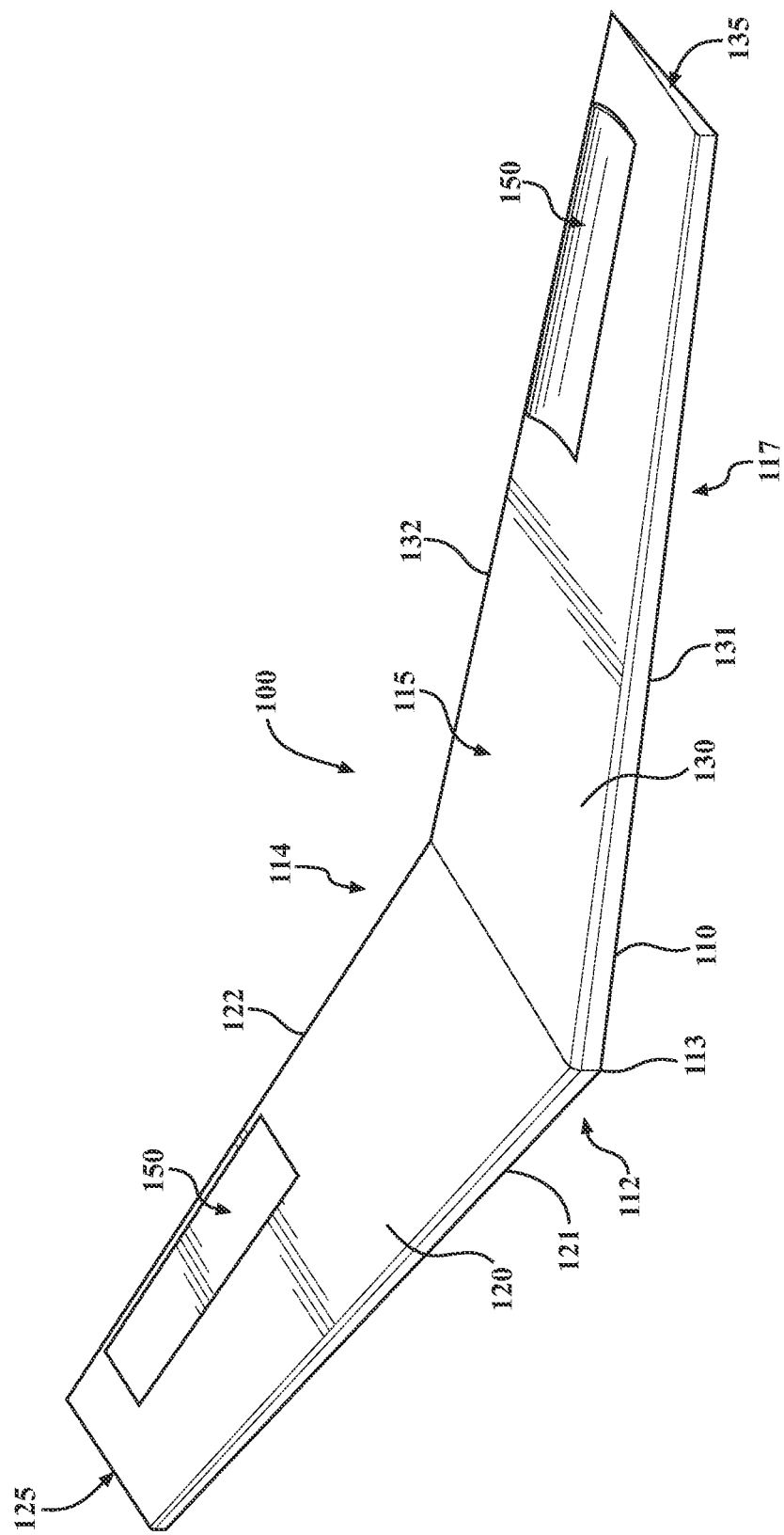
FIG. 7 shows an example of active management of the morphing members on the upper side of the aircraft, showing the morphing member on a first wing in a non-activated condition and the morphing member on a second wing in an activated condition.

FIGS. 6 and 7 show instances in which the morphing member 150 on one of the wings or on one side of the aircraft 100 are activated. In FIG. 6, the morphing member 150 on the first wing 120 is in an activated condition, and the morphing member 150 on the second wing 130 is in a non-activated condition. In FIG. 7, the morphing member 150 on the first wing 120 is in a non-activated condition, and the morphing member 150 on the second wing 130 is in an activated condition.

These types of activation patterns can be implemented if it is desired to move the aircraft 100 to the left or to the right. For purposes of this example, the right corresponds to the first wing 120 and the left corresponds to the second wing 130. For instance, if it is desired to move the aircraft to the left, then the morphing member 150 on the second wing 130 can be activated while the morphing member 150 on the first wing 120 can remain in a non-activated condition, as is shown in FIG. 7. Further, if it is desired to move the aircraft 100 to the right, then the morphing member 150 on the first wing 120 can be activated while the morphing member 150 on the second wing 120 can remain in a non-activated condition, as is shown in FIG. 6. When the morphing member 150 is activated, the change in shape causes a disruption in the air flow, which, in turn, can cause loss of lift on the corresponding side of the kite. As a result, a rolling moment is created. It should be noted that the activation patterns shown in FIGS. 6 and 7 can also be used in turbulent air. In such case, the morphing member 150 on the first wing 120 and/or the morphing member 150 on the second wing 130 can be activated as needed to stabilize the aircraft 100.

Figure 8:
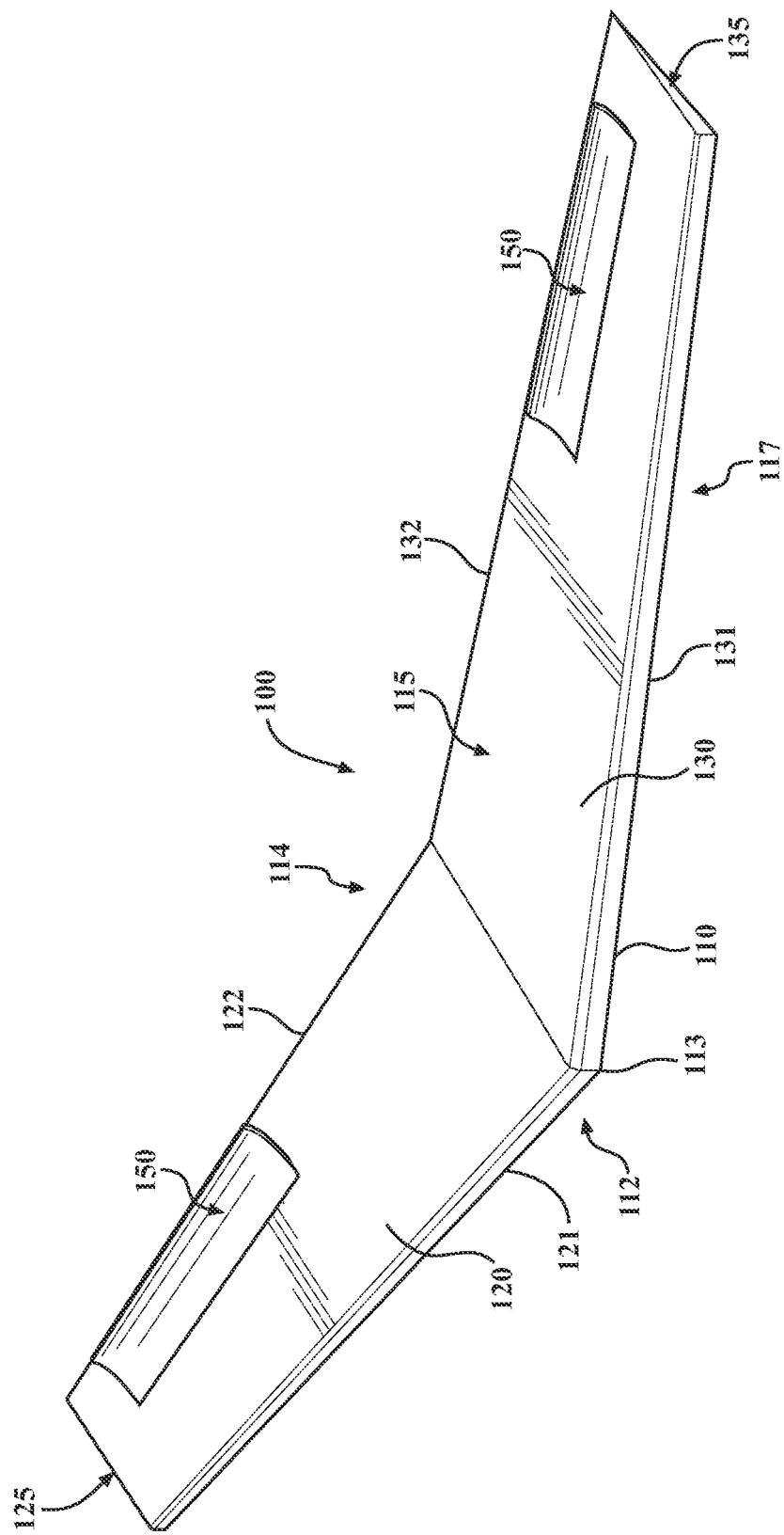
FIG. 8 shows an example of active management of the morphing members on the upper side of the aircraft, showing the morphing member on a first wing in an activated condition and the morphing member on a second wing in an activated condition.

FIG. 8 shows an example in which the morphing member 150 on the first wing 120 is in an activated condition, and the morphing member 150 on the second wing 130 is in an activated condition. Such an activation pattern can be used to cause a downward movement of the aircraft. For instance, the aircraft 100 may be flying at a certain altitude, but now it is desired to take the aircraft 100 to a lower altitude. In such case, the morphing members 150 can be activated as shown in FIG. 8 to cause the downward movement. When the desired altitude is reached, the morphing members 150 can be deactivated to substantially return to a non-activated condition. It will be appreciated that the activation pattern shown in FIG. 8 may also be used to stabilize the aircraft 100 is certain conditions.

Figure 9:
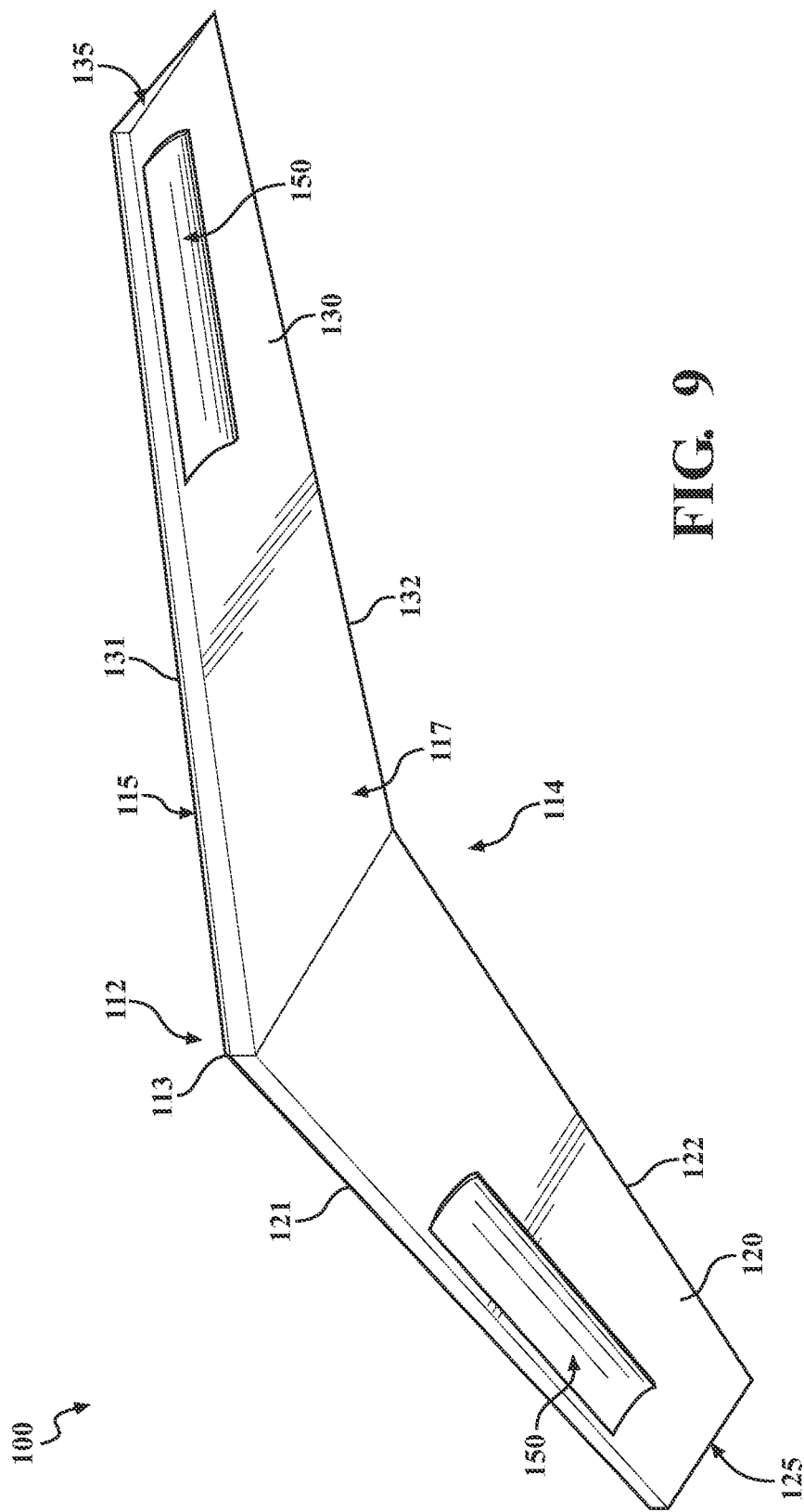
FIG. 9 shows an example of active management of the morphing members on the lower side of the aircraft, showing the morphing member on a first wing in an activated condition and the morphing member on a second wing in an activated condition.
Figure 10:
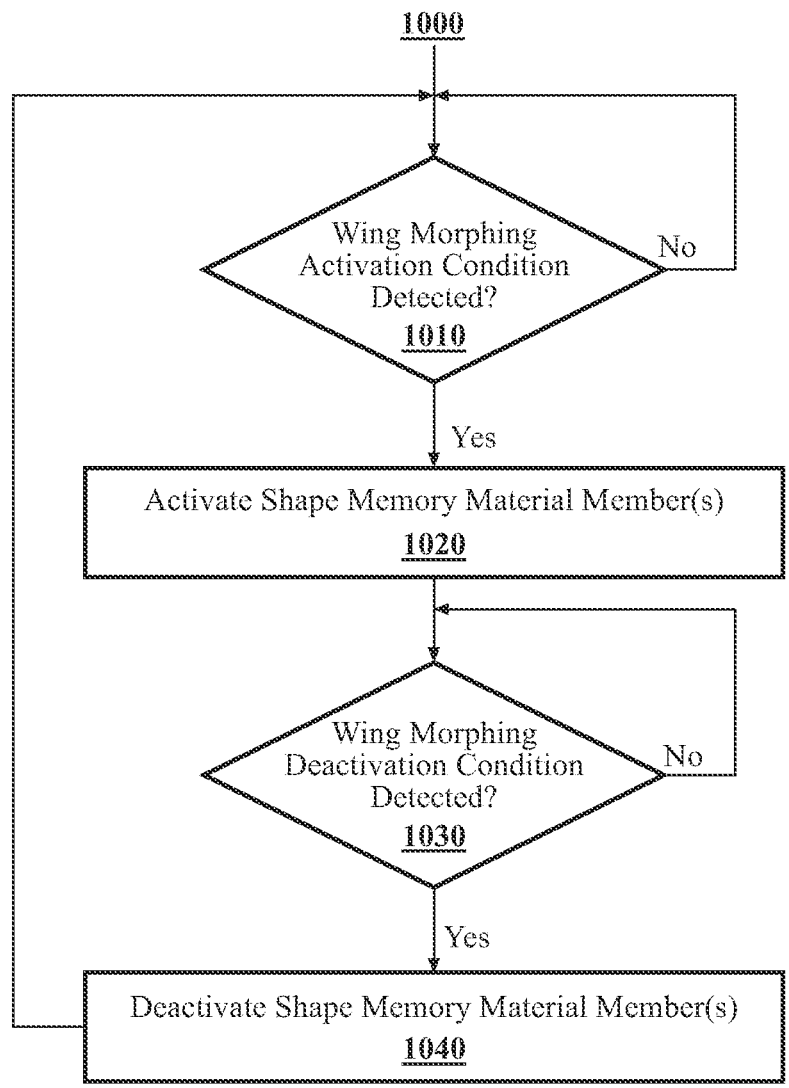
FIG. 10 is an example of a method for an aircraft.

FIG. 9 shows an example in which the morphing member 150 on the lower side 117 of the first wing 120 is in an activated condition, and the morphing member 150 on the lower side 117 of the second wing 130 is in an activated condition. Such an activation pattern can help in stabilizing the aircraft 100 when the aircraft 100 is climbing at higher angles of attack so that the nose 113 of the aircraft 100 is pointed high up.

Now that the various potential systems, devices, elements and/or components of the aircraft 100 and the system 300 have been described, an example of a method of morphing the wing of an aircraft will now be described. The method described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
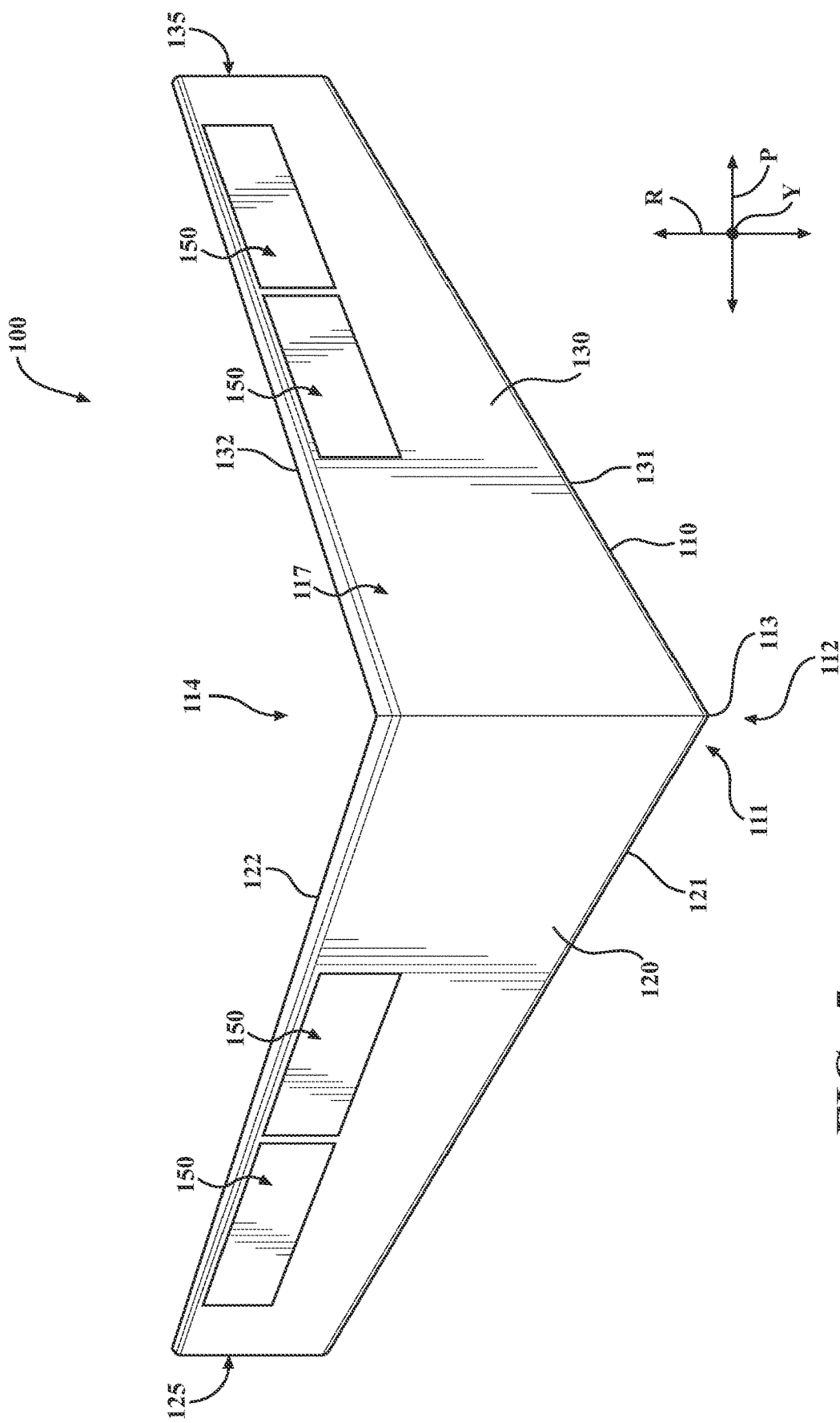
FIG. 5 is an example of an aircraft, showing a plurality of morphing members provided on each wing.

Turning to FIG. 5, an example of a method 1000 is shown. For the sake of discussion, the method 1000 can begin with the shape memory material member(s) 154 of the morphing members 150 in a non-activated mode. In the non-activated mode, electrical energy from the power source(s) 340 is not supplied to the shape memory material member(s) 154. The morphing members 150 can be in a non-activated configuration, such as is shown in FIG. 1.

At block 1010, it can be determined whether a wing morphing activation condition has been detected. The wing morphing activation condition may be detected by the control module(s) 370, the processor(s) 310, and/or one or more sensor(s) 330. For instance, the control module(s) 370, the processor(s) 310, and/or one or more sensor(s) 330 can analyze data acquired by the sensor(s) 330 to determine whether a wing morphing activation condition. For instance, the control module(s) 370, the processor(s) 310, and/or one or more sensor(s) 330 can determine whether the sensor data acquired by the sensor(s) 330 meets a respective wing morphing activation threshold. Alternatively or additionally, the control module(s) 370, the processor(s) 310, and/or one or more sensor(s) 330 can detect a user input indicating that the morphing members 150 should be activated. The user input can be provided via the input interface(s) 350. For instance, the detecting can be performed on a continuously, periodically, irregularly, randomly, in response to a command or user input (e.g., as provided on the input interface(s) 350), and/or in response to an event or condition(s).

If a wing activation condition is not detected, the method 1000 can end, return to block 1010, or proceed to some other block. However, if a wing activation condition is detected, then the method can proceed to block 1020.

At block 1020, one or more of the shape memory material members 154 can be activated. As a result, the morphing member(s) 150 can be caused to morph into an activated configuration. Of course, the control module(s) 370 and/or the processor(s) 310 may only actuate certain individual shape memory material member(s) 154 while leaving others in a non-activated condition. Thus, the control module(s) 370 and/or the processor(s) 310 can cause or allow the flow of electrical energy from the power sources(s) 340 to the shape memory material member(s) 154.

When activated, the shape memory material member(s) 154 can contract. The contraction of the shape memory material member(s) 154 can cause the morphing members 150 (and the wing(s) 120, 130) to morph into an activated configuration. Examples of the activated configurations are shown in FIGS. 11B and 11C. The method can continue to block 1030.

At block 1030, it can be determined whether a wing morphing deactivation condition has been detected. The wing morphing deactivation condition may be detected by the control module(s) 370, such as based on data acquired by the sensor(s) 330 and/or by detecting a user input or the cessation of a user input. If a wing morphing deactivation condition is not detected, the method 1000 can return to block 1030, or proceed to some other block. However, if a wing morphing deactivation condition is detected, then the method can proceed to block 1040.

At block 1040, the shape memory material member(s) 154 can be deactivated. Thus, the control module(s) 370 and/or the processor(s) 310 can cause the flow of electrical energy from the power sources(s) 340 to the shape memory material member(s) 154 to be discontinued. As a result, the shape memory material member(s) 154 can expand and can substantially return to a non-activated configuration. Consequently, the morphing members 150 (and the wing(s) 120, 130) can substantially return to the non-activated configuration.

The method 1000 can end. Alternatively, the method 1000 can return to block 1010 or some other block.

It will be appreciated that arrangements described herein can provide numerous benefits, including one or more of the benefits mentioned herein. For example, arrangements described herein can facilitate aircraft stability. Arrangements described herein can allow for load alleviation. Arrangements described herein can allow both passive and active control of the wing shape of an aircraft responsive to real-time operational forces acting upon the aircraft. Arrangements described herein can provide for remote and/or automated control of the shape/morphology of a wing during flight. Arrangements described herein can be lightweight and add negligible weight to the aircraft. Arrangements described herein can make use of existing power sources, or a small power source can be added. Compared to systems that use a motor, arrangements described here are much lighter and better suited for flight. Arrangements described herein can enable large and quick changes in shape, configuration, or morphology of a wing based on real-time changes to the wing, the aircraft that the wing is a part of, and/or conditions of the operational environment. Arrangements described herein can reduce the number of moving parts on the aircraft and can reduce aircraft load.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. An aircraft comprising:
a wing; and
a morphing member operatively connected to the wing, the morphing member including a base and a shape memory material member operatively connected to the base, the base being made of a flexible material, whereby a shape of the morphing member changes when the shape memory material member is activated, the shape memory material member being arranged in a non-linear pattern.

2. The aircraft of claim 1 wherein the flexible material is a fabric.

3. The aircraft of claim 1, wherein the shape memory material member is a shape memory alloy wire.

4. The aircraft of claim 1, wherein the wing including a leading edge and a trailing edge, wherein the wing includes an upper side and a lower side, and wherein the morphing member is operatively connected to one of:
the upper side of the wing proximate the trailing edge; and
the lower side of the wing proximate the leading edge.

5. The aircraft of claim 1, wherein the shape memory material member is arranged in a pattern, and wherein the pattern is configured to cause the morphing member to curl in one direction when the shape memory material member is activated.

6. The aircraft of claim 1, wherein, when in a non-activated condition, the morphing member is substantially flat against the wing.

7. The aircraft of claim 1, wherein a side or a perimeter portion of the morphing member is not attached to the wing.

8. An aircraft comprising:
a wing; and
a morphing member operatively connected to the wing, the morphing member including a base and a shape memory material member operatively connected to the base, the base being made of a flexible material, whereby a shape of the morphing member changes when the shape memory material member is activated, the shape memory material member being arranged in a pattern, and the pattern being configured to cause the morphing member to curl in a plurality of directions when the shape memory material member is activated.

9. A system comprising:
an aircraft including:
a wing; and
a morphing member operatively connected to the wing, the morphing member including a base and a shape memory material member operatively connected to the base, the base being made of a flexible material, the shape memory material member being arranged in a non-linear pattern; and
one or more processors operatively connected to selectively cause the shape memory material member of the morphing member to be activated and deactivated.

10. The system of claim 9, further including one or more power sources operatively connected to supply electrical energy to the shape memory material member,
wherein the one or more processors are operatively connected to control a supply of electrical energy from the one or more power sources to the shape memory material member, the one or more processors being programmed to initiate executable operations comprising:
detecting a wing morphing activation condition; and
responsive detecting the wing morphing activation condition, causing electrical energy to be supplied to the shape memory material member from the one or more power sources, whereby the shape memory material member is activated to cause a shape of the morphing member to change, whereby one or more aerodynamic characteristics of the aircraft are changed.

11. The system of claim 9, further including one or more sensors operatively connected to the one or more processors, wherein the one or more sensors are configured to acquire sensor data about at least one of: the aircraft and an external environment of the aircraft, wherein the one or more processors are configured to selectively cause the shape memory material member of the morphing member to be activated and deactivated based on the sensor data.

12. The system of claim 9, wherein the one or more processors are configured to selectively cause the shape memory material member of the morphing member to be activated and deactivated autonomously or in response to remote control inputs.

13. The system of claim 9, wherein the flexible material is a fabric, and wherein the shape memory material member is a shape memory alloy wire.

14. The system of claim 9, wherein the wing including a leading edge and a trailing edge, wherein the wing includes an upper side and a lower side, and wherein the morphing member is operatively connected to one of:
the upper side of the wing proximate the trailing edge; and
the lower side of the wing proximate the leading edge.

15. The system of claim 9, wherein the shape memory material member is arranged in a pattern, and wherein the pattern is configured to cause the morphing member to curl in one direction when the shape memory material member is activated.

16. The system of claim 9, wherein, when in a non-activated condition, the morphing member is substantially flat against the wing.

17. A system comprising:
an aircraft including:
a wing; and
a morphing member operatively connected to the wing, the morphing member including a base and a shape memory material member operatively connected to the base, the base being made of a flexible material, the shape memory material member being arranged in a pattern, and the pattern being configured to cause the morphing member to curl in a plurality of directions when the shape memory material member is activated; and
one or more processors operatively connected to selectively cause the shape memory material member of the morphing member to be activated and deactivated.

18. A method for morphing a wing of an aircraft, a morphing member operatively connected to the wing, the morphing member including a base and a shape memory material member operatively connected to the base, the base being made of a flexible material, the shape memory material member being arranged in a non-linear pattern, the method comprising:
detecting a wing morphing activation condition; and
responsive to detecting the wing morphing activation condition, activating the shape memory material member to cause the morphing member to morph into an activated configuration.

19. The method of claim 18, wherein detecting the wing morphing activation condition is based on sensor data about at least one of the aircraft and an external environment of the aircraft.

20. The method of claim 18, further including:
detecting a wing morphing deactivation condition; and
responsive to detecting the wing morphing deactivation condition, deactivating the shape memory material member to cause the morphing member to substantially return to a non-activated configuration.

21. A method for morphing a wing of an aircraft, a morphing member operatively connected to the wing, the morphing member including a base and a shape memory material member operatively connected to the base, the base being made of a flexible material, the shape memory material member being arranged in a pattern, and the pattern being configured to cause the morphing member to curl in a plurality of directions when the shape memory material member is activated, the method comprising:

detecting a wing morphing activation condition; and responsive to detecting the wing morphing activation condition, activating the shape memory material member to cause the morphing member to morph into an activated configuration.

22. An aircraft comprising:

a wing; and a morphing member operatively connected to the wing, the morphing member including a base and a shape memory material member operatively connected to the base, the base being made of a flexible material, whereby a shape of the morphing member changes when the shape memory material member is activated, the wing including a recessed area in which the morphing member resides such that, when in a non-activated condition, the morphing member is substantially flush with the wing.

23. An aircraft comprising:

a wing; and a morphing member operatively connected to the wing, the morphing member including a base and a shape memory material member operatively connected to the base, the base being made of a flexible material, whereby a shape of the morphing member changes when the shape memory material member is activated, the morphing member being operatively connected to a lower side of the wing proximate a leading edge.

24. An aircraft comprising:

a wing; and a morphing member operatively connected to the wing, the morphing member including a base and a shape memory material member operatively connected to the base, the base being made of a flexible material, whereby a shape of the morphing member changes when the shape memory material member is activated, a free end or a free perimeter portion of the morphing members being located proximate a trailing edge of the wing and not extending beyond the trailing edge of the wing.

\* \* \* \* \*

UNITED STATES PATENT AND TRADEMARK OFFICE
CERTIFICATE OF CORRECTION

PATENT NO. : 11,932,390 B2
APPLICATION NO. : 17/721793
DATED : March 19, 2024
INVENTOR(S) : Rikin Gupta et al.

It is certified that error appears in the above-identified patent and that said Letters Patent is hereby corrected as shown below:

On the Title Page

In the Assignees field: delete "Toyota (JP)" and insert --Toyota-shi, Aichi-ken (JP)--

In the Specification

Column 5, Line 52: delete "600 N mm" and insert --600 N·mm--

Column 5, Line 53: delete "500 N mm" and insert --500 N·mm--

Column 5, Line 53: delete "(N mm)" and insert --(N·mm)--

Signed and Sealed this
Sixteenth Day of April, 2024

Katherine Kelly Vidal
*Director of the United States Patent and Trademark Office*